Oct. 19, 1971    H. F. DUNLAP ET AL    3,613,378
UNDERGROUND STORAGE
Filed Nov. 13, 1967

INVENTORS
Robert Wilson
Henry F. Dunlap
BY
*Bluchers Sharp*
Attorney

United States Patent Office 3,613,378
Patented Oct. 19, 1971

3,613,378
UNDERGROUND STORAGE
Henry F. Dunlap and Robert Wilson, Dallas, Tex., assignors to Atlantic Richfield Company, Philadelphia, Pa.
Filed Nov. 13, 1967, Ser. No. 682,114
Int. Cl. B65g 5/00
U.S. Cl. 61—.5
20 Claims

ABSTRACT OF THE DISCLOSURE

Underground storage comprised of a conduit system extending into one or more storage sections of a large, vertically extended volume of void spaces and rock rubble, such as a chimney created by a subsurface nuclear explosion. Each storage section traverses an impermeable formation and is separated from a more permeable nonstorage section by one or more lateral impermeable barriers at least partially composed of a time-setting material which has set. The barriers may be formed by injecting enough flowable, time-setting barrier material lighter than a heavier liquid in the volume to form a floating layer over the heavier liquid which was previously located or located and adjusted to a predetermined level which separates impermeable from permeable zones. A controlled fluid loss material may be placed opposite permeable zones.

BACKGROUND OF THE INVENTION

This invention pertains to an underground storage system for fluids wherein one or more lateral impermeable layers are used to divide a large vertically long, underground volume into one or more storage sections and one or more nonstorage sections. The large, long volume is a chimney created by an underground nuclear explosion.

Since the Plowshare Program was established to investigate and develop peaceful uses for nuclear explosives, a large number of underground nuclear explosion tests have beeen carried out in the United States in various rock types. These tests provide sufficient understanding of the phenomena involved to predict the effects of nuclear explosions in diverse rock media. An underground nuclear explosion may be contained or it may cause a crater at the surface of the earth. This invention may be applied to either type of explosion provided that the explosion results in a vertically-extended, rubble-containing volume and that, in the case of a crater, the crater is formed in or through a sufficiently large vertical expanse of competent impermeable formation to provide the vertical walls of a storage system. Generally, however, this invention will be used in a vertically-extended, cylindrical, rubble-containing chimney created by a nuclear explosion placed far enough below the surface of the earth to be contained. A nuclear explosion is contained when the explosive energy will not cause a crater at the surface of the earth. A review of the results of sixty nuclear blast experiments indicates that there is better than a 90 percent chance that the nuclear blast will not crater to the surface if the scaled depth of burial is about 300 feet or deeper. Scaling takes into consideration the yield of the explosive. Some nuclear explosives cratered to the surface of the earth at scaled depths as great as 650 feet; therefore, a scaled depth of burial of more than 650 feet should be used where absolute containment is desired. The scaled depth of burial (SDB) in feet is converted to the actual depth of burial (D) in feet by the following Equation 1:

$$D = (SDB)(W^{1/3.4}) \qquad (1)$$

where W is the yield of the nuclear device in kilotons.

The events leading to the formation of a cylindrical vertical chimney of broken rock involve emplacing in a borehole a nuclear explosive (a fusion or fission, or combination bomb) far enough below the surface to be contained and of sufficient yield to produce an unstable cavity which will collapse to form the chimney (generally, 5 kilotons and greater). The nuclear explosive is detonated, producing in microseconds high amounts of energy and heat that are unthinkable in any other form of explosive even though it is standard practice to state the yield of a nuclear device in terms of kilotons of TNT (trinitrotoluene).

Upon detonation, an initial cavity is formed as a result of vaporization, melting and crushing of adjacent rock media. The gases within the cavity are at extremely high temperature on the order of millions of degrees and pressure amounting to millions of atmospheres. The expanding energy of the gases compacts and thrusts the surrounding rock radially outward from the shot point creating in fractions of a second a spherical cavity. This high internal pressure expands the cavity until the internal pressure is equivalent to the over-burden pressure. At this point the gas pressure supports the overburden, thus preserving the shape of the cavity for a temporary period of time. The radius of the cavity produced by each explosive is a function of the energy yield of the explosive and, to a lesser extent, the depth of burial, the average density of the overlying formations, the vapor-forming liquid content of the host rock, and the rock properties. The equation for the cavity radius is $$R = \frac{CW^{1/3}}{(dh)^{1/4}} \qquad (2)$$

where R is the cavity radius in feet, C is a constant depending upon rock and fluid content and ranges between 225 and 345, W is the expected yield of the particular nuclear device in equivalent kilotons of TNT, d is the average overburden density in grams per cubic centimeter ranging from about 1.6 to 2.7, and h is the depth of burial in feet. Suitable estimates for purposes of this invention may be derived by using a value of 290 for the constant C and 2.2 for d.

After a period of time, as heat losses, gas leak off and vapor condensation occur, the pressure is reduced until the pressure within the cavity is below the overburden pressure and the fractured rock above the cavity can no longer be supported. The roof of the cavity collapses in bits and pieces which periodically fall to the bottom of the cavity. A cylindrical column (chimney) of broken rock develops upward as the cavity fills with rock falling from the roof. Roof collapse continues progressively upward until the volume of interstitial space between the pieces of broken rock in the chimney approximates the original cavity volume before the cavity began to collapse.

The vertical, cylindrical volume of broken rock is called a chimney. For nuclear explosions in fairly competent formations or in deep formations, the chimney has essentially the same diameter as the original cavity and has a height of about four to seven times the cavity radius. The ratio of chimney height to original cavity radius is, therefore, dependent on the bulk porosity of the broken chimney rock and the cavity volume before collapse. More explicitly, the height of the chimney is about four times the cavity radius divided by three times the net increase in porosity in the rubbled zone stated in a fraction. This fraction ranges between 0.2 and 0.3 and for the formations used here will probably be on the order of 0.25. The interstitial voids or pores formed by the rubble have a high conductivity and provide suitable volume for storage of fluids.

It has been proposed to use nuclear explosion created chimneys for subsurface storage provided that the chimney can be confined to an impermeable stratum, or that leakage of stored fluid to surrounding formations can be controlled by carefully maintaining certain pressure conditions or by sealing the walls of the chimney in any of the ways that porous formations are sealed in the drilling or underground storage art. There are many problems associated with preventing leakage by maintaining critical pressure conditions or by sealing the walls of a large, rubble-containing chimney. While it is possible to find a stratum thick enough to confine a chimney and its associated fractures, it is rare to find an impermeable stratum this thick exactly where the storage facility is needed. Moreover, the costs of a nuclear explosion are such that it is advantageous to use a nuclear device having a large yield rather than a small nuclear device of only one or two kilotons. A five kiloton shot is small, yet it is likely to create a chimney 240 or more feet in height neglecting the effect of fractures. There would usually be at least one permeable stringer or stratum in 240 plus feet of formation. More common occurrence would be to find several permeable zones in this distance.

It would, therefore, be desirable to provide a system for storing fluids in a large, vertical volume of void spaces and rubble without the need for sealing the walls of the storage volume or controlling pressure within and without the storage volume.

It would also be advantageous to provide a system for using nuclear explosion created chimneys suitable for any yield explosive device and for stratified formations containing one or more permeable zones.

SUMMARY OF THE INVENTION

This invention involves recoverable storage of fluids below the surface of the earth in one or more vertically spaced sections of a subsurface volume comprised of void spaces and earth rubble. The underground volume, which is divided into two or more sections, has a relatively large lateral cross section of more than twenty feet and of at least one-twentieth of its height. Its height is such that it is likely to extend into or past both an impermeable and a permeable zone and is greater than sixty feet. The vertically spaced sections are separated by one or more impermeable barriers extending laterally across the underground volume. Each lateral impermeable barrier is located to isolate an impermeable section or zone of the walls of the underground volume from a more permeable section so that fluids may be recoverably stored only in a section surrounded by an impermeable section of formation. This prevents loss of such fluids to permeable sections communicating with the underground volume. In this way, the large, underground volume may be located where desired without the need for locating an extremely thick, continuously impermeable stratum or section of the earth. Moreover, there is excellent control over the more permeable zones in the walls of the underground volume and there is little need to control the fluid pressure in the formations surrounding the storage sections of the underground volume.

More specifically, the subsurface storage of this invention is comprised of a chimney created by a subsurface nuclear explosion in a manner similar to that previously described. Extending across the chimney somewhere between the top and bottom of the chimney is at least one lateral impermeable barrier which separates the chimney at least into a first and second section. Generally, there will be more than two sections; however, there may be cases where only one lateral barrier will be required. For example, if the walls of the bottom portion of the chimney are coated with fused rock and this bottom portion holds enough fluid, it could be practical to use only this bottom portion of the chimney as a storage section. If the first section of the two sections is the storage section, there will be a conduit system extending from the surface of the earth into this first section. This conduit system will be suitable for adding fluid to and for removing fluid from this first section.

This underground storage system is made by creating an underground volume of void spaces and rock rubble surrounded by formation zones of the earth. This volume has large vertical and lateral dimensions with the vertical direction being greater than the lateral dimension. In any well-known manner, there is then selected or located an impermeable zone in the walls of the volume. The impermeable zone is separated from other zones with one or more lateral layers of flowable time-setting barrier material extending laterally across the underground cavity. Thereafter, fluids are recoverably stored opposite the separated impermeable zone.

Broadly, the impermeable barrier is formed by locating the top of a first liquid in the subsurface volume, or rubble-containing cavity, and injecting the flowable, time-setting barrier material which has a specific gravity less than the specific gravity of the first liquid. This light barrier material is flowable enough to spread laterally through the rock rubble in the volume and form a floating layer on the heavier first liquid. Since the amount of liquid barrier material injected is sufficient to form a layer that extends to the walls of the volume, the barrier material upon setting forms at least a part of a lateral impermeable barrier separating two vertically spaced sections of the volume.

Under some conditions, it may be necessary to either inject the heavy first liquid into the volume, or to remove first liquid from the volume, or to do both, in order to properly position the barrier formed on top of this liquid in the volume. Thus, after selecting an impermeable area in the walls of the volume, the top of the first liquid is adjusted to a level such that the lateral impermeable barrier may be formed over the first liquid. At least a portion of this lateral impermeable barrier will be in line with or opposite the impermeable area. In this way, when the lateral impermeable barrier is formed on top of the first liquid, the barrier will effectively separate the impermeable area from other areas that may be more permeable.

Sometimes, it will be necessary to pump first liquid from the volume while injecting the flowable, time-setting material in order to maintain the desired location for the lateral barrier.

In situations where an impermeable zone might be underlain and overlain by permeable strata, the vertical extent or thickness of the impermeable area will be established or located. The top of the first liquid will be adjusted so that at least a portion of a lower barrier is formed in line with a lower portion of the impermeable zone. After the lower barrier sets, an upper barrier is formed in line with an upper portion of the impermeable zone. The two barriers and the impermeable walls of the impermeable zone form an excellent storage reservoir.

In a similar manner, a permeable zone between two impermeable zones may be located and separated from upper and lower impermeable zones with two lateral barriers. At least a portion of the lower barrier would be adjacent the top portion of the lower impermeable zone and at least a portion of the upper barrier would be adjacent or in line with the bottom portion of the upper impermeable zone with the permeable stratum isolated between the two barriers.

Permeable strata may be further isolated or controlled by placing a low fluid loss flowable material opposite the permeable zones. For example, a low fluid loss material could be placed on a lower barrier and an upper barrier may be formed on this low fluid loss material.

DESCRIPTION OF PREFERRED EMBODIMENTS

Figure 1:
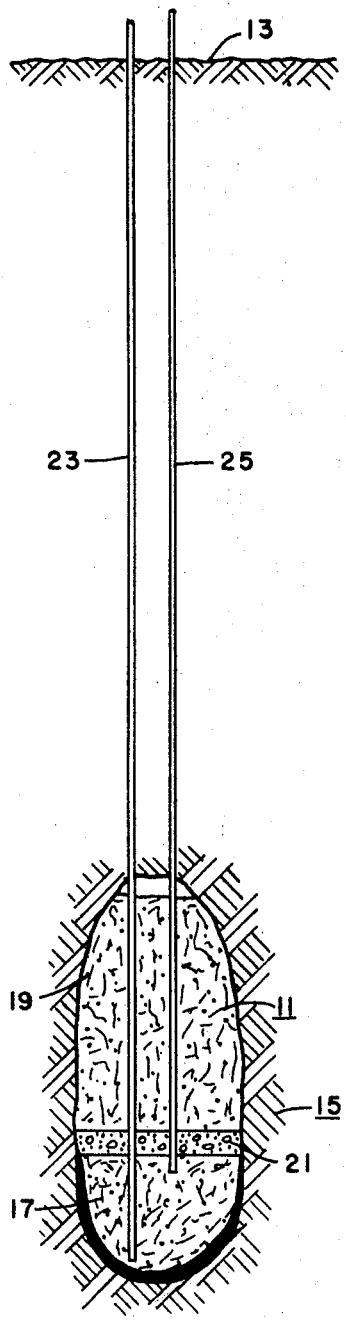
FIG. 1 is a vertical, cross-sectional view of a subsurface, rubble-containing volume with a lower impermeable storage section separated by a lateral barrier from an upper more permeable section.

In FIG. 1, there is illustrated subsurface volume 11 which is below surface 13 of the earth. Volume 11 is comprised of void spaces and earth or rock rubble and is surrounded by formation 15, which forms the walls of the underground volume. Volume 11 has a relatively large lateral cross section or dimension of more than twenty feet and which is at least one-twentieth of height of volume 11. As illustrated, it is preferred that volume 11 be a chimney created by a subsurface nuclear explosion. It is further preferred that the chimney be created by a contained nuclear explosion and that nuclear explosive device has a yield of at least five kilotons of TNT (trinitrotoluene). The large height of volume 11 is such that the volume is likely to extend into or past an impermeable zone and a permeable zone in formation 13; however, in FIG. 1, these different zones are not shown for reasons hereinafter made apparent. Volume 11 will have a height of at least sixty feet and will usually be one hundred feet or more high.

Volume 11 is divided into two or more vertically spaced sections. As shown in FIG. 1, volume 11 is divided into first section 17 and second section 19. As illustrated, first section 17 is below second section 19 and is separated therefrom by lateral impermeable barrier 21 which extends laterally or horizontally across the chimney or volume 11 to formation 15. In order to illustrate one special arrangement for the storage system of this invention, it is assumed that the walls of first section 17 formed by formation 15 and below impermeable barrier 21 are coated with fused rock or earth created by the extreme temperature of the nuclear explosive. This fused rock coating would render the walls impermeable. As a result of this coating and the lateral impermeable barrier, first section 17 is enclosed with impermeable substances and is essentially fluid tight. First section 17 thereby forms an excellent underground container which is filled with a high bulk porosity rock rubble. The high bulk porosity of the rubble provides a highly conductive storage volume in which fluids may be recoverably stored.

The fluids stored in first section 17 are placed in and removed from the storage section by way of a suitable conduit system extending from surface 13 into the first section 17. This conduit system may be any suitable arrangement for this purpose and may include pumps, hydraulic lift systems, or any of the other many systems for adding and removing fluids in underground operations. For illustrative purposes only, this conduit system is shown as being comprised of displacing conduit 23, which extends to the lower part of first section 17, and product conduit 25, which extends to the upper part of first section 17. This illustrated conduit system allows stored product fluids to be added to and removed from section 17 by way of product conduit 25. At the same time fluid is either injected into the storage section by way of displacing conduit 23 to displace product fluids out of the storage section, or fluid is displaced out of the storage section as product fluids are added to the storage section. Normally, the displacing fluid will be water and the stored product fluids will be lighter than water, but the displacing fluid could be a gas and the stored product a liquid and the function of the conduits reversed. This accounts for the relative location of the two conduits. It will normally be best to incorporate pumps or other artificial lift means in the conduit system to provide better control over pressures in the storage section.

An arrangement similar to that just described and illustrated in FIG. 1 would be used where the upper part of the chimney is contained in an impermeable zone except that upper or second section 19 would be the storage section and the flow conduits would be placed in this section.

Usually, there is no assurance that the walls of the lower section of volume 11 will be coated with fused rock to a sufficient extent to provide an adequately large storage section. Normally, when the chimney is created for storage purposes, it will be located in the largest, vertical impermeable section of strata available and there will be one or more permeable stratum at least partially traversed by the chimney. By the same token, in situations where the chimney was previously created for another purpose; for example, underground retorting of oil shale or tar sands, or to stimulate petroleum reservoirs, the chimney will at least partially traverse a permeable stratum to which stored fluids could be lost and not readily recovered. The permeable stratum could be anywhere between the top and bottom of the chimney. In still other situations, the chimney could be designed to extend either above or below a petroleum producing zone into an impermeable zone, and the producing zone could be produced while the impermeable section of the chimney was used for storage. In any of the aforementioned types of situations, in accordance with this invention, the permeable zones would be separated from one or more impermeable sections by one or more lateral impermeable barriers 21 so that fluids could be recoverably stored opposite an impermeable section. A section is impermeable when the formation or zone surrounding the section has a permeability to stored product such that the amount of stored product lost per year will not make the storage uneconomical; for example, a loss per year of less than one percent.

As mentioned previously, underground volume 11 may be specifically created for use in this invention or it may already be available. After volume 11 is created and ready for at least partial use as a storage container, there is then located or selected an impermeable section in the walls of volume 11.

After selecting the impermeable section, the impermeable section is separated from another section of the subsurface volume. This is accomplished with lateral layer or layers of flowable time-setting barrier materials which extend across the volume to formation 15 and which set to form one or more impermeable barriers; for example, impermeable barrier 21. One or more such barriers will be required depending on the situation encountred. The simplest situation requiring only one lateral barrier exists when only either the top portion or the bottom portion of volume 11 is to be used for storage and the walls of this portion are known to be impermeable. In either of these situations, the desired portion is separated from the remainder of volume 11 by a single lateral barrier and the flow conduits are placed in the separated impermeable section.

Another simple situation would result when there is known impermeable section thick enough to provide adequate reservoir capacity inside volume 11 opposite the impermeable section. In this instance, two lateral barriers would be formed to isolate or separate the impermeable section from other sections of volume 11. One barrier would be at a low point in line with the impermeable section and one at a high point in the impermeable section. In this situation, the upper and lower boundaries of the impermeable section would not need to be established since there would be sufficient storage within the known impermeable section.

A third simple situation arises when there is a thin permeable stringer in formation 15 to be isolated; however, in this instance and other instances involving permeable zones and impermeable zones, it may be necessary to locate the permeable and impermeable sections. Generally, it is only necessary to approximate the location of the permeable zones as this method of creating underground storage permits much leeway in separating an impermeable zone from a permeable one. Methods and apparatus for conducting subsurface permeability or injectivity profiles are widely known and are not described here since this invention is not directed to any particular type of profile system and such description is not necessary for an understanding and use of this invention.

Figure 2:
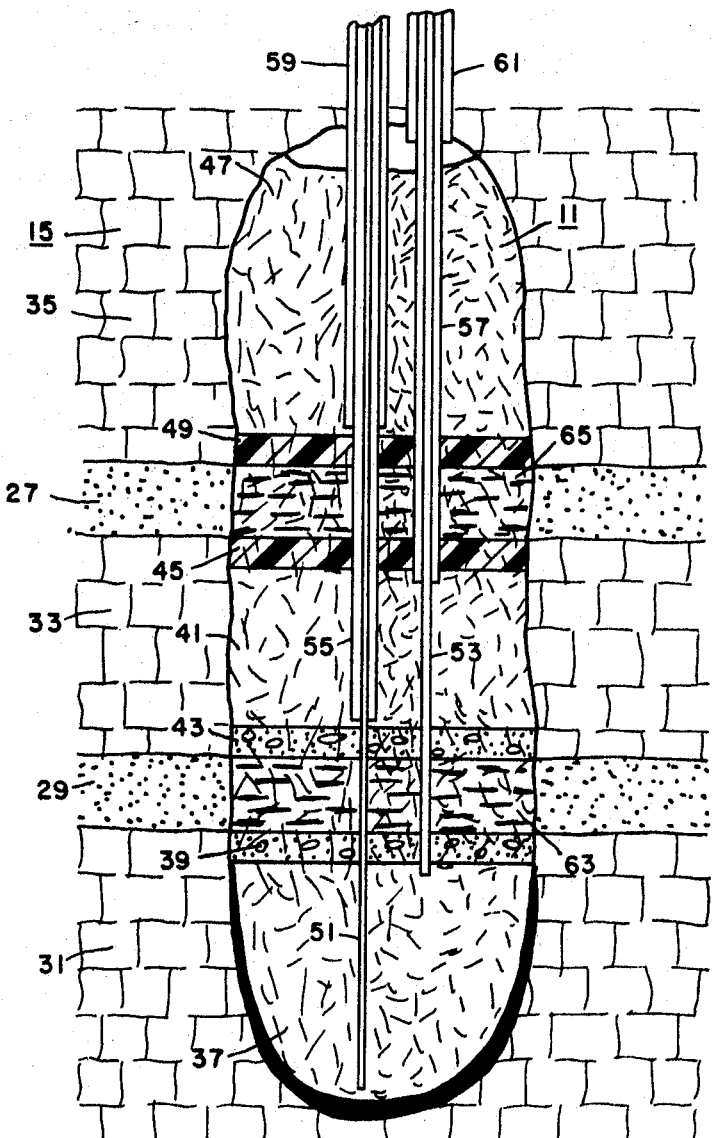
FIG. 2 is a vertical, cross-sectional view of a subsurface, rubble-containing volume with two vertically spaced permeable strata with each stratum being isolated by an upper and a lower impermeable barrier with a low fluid loss material between the barriers.

In the situation where only a single thin permeable stringer is present, one lateral barrier thick enough to cover the entire storage would be sufficient. When, however, there are two or more permeable zones to be separated from impermeable sections, or when a single permeable zone is too thick to be practically separated by a single lateral impermeable barrier, more than one lateral layer will be used. Such a situation is illustrated in FIG. 2 in which there is shown upper permeable zone 27 and lower permeable zone 29 in formation 15. Below lower permeable zone 29, there is lower impermeable zone 31. Between the permeable zones, is middle impermeable zone 33, and above the permeable zones is upper impermeable zone 35.

Adjacent or opposite lower impermeable zone 31 is lower storage section 37 which is separated from lower permeable zone 29 by first lateral impermeable barrier 39. Surrounded on its vertical sides by middle impermeable zone 33 is middle storage section 41, which is separated from lower permeable zone 29 by second lateral impermeable barrier 43, and which is separated from upper permeable zone 27 by third lateral impermeable barrier 45. Encircled on three sides by upper impermeable zone 35 is upper storage section 47, which is separated from upper permeable zone 27 by fourth lateral impermeable barrier 49.

As shown in FIG. 2, there is a conduit system extending into each storage section, which conduit system is suitable for removing and adding fluids to the storage section. More specifically, lower storage section 37 has lower displacing conduit 51 and lower product conduit 53. Middle storage section 41 has middle displacing conduit 55 and middle product conduit 57. Upper storage section 47 has upper displacing conduit 59 and upper product conduit 61. In this illustrated arrangement, either the same or different fluids may be recoverably stored in each storage section opposite its respective impermeable zone by way of these conduits in a manner similar to that previously described. Of course, if it is preferred, the product conduit could be a single pipe perforated opposite the top and middle storage sections and a single displacing conduit used in which case the displacing fluid would move upward into each section after the lower section had been depleted of stored product.

In FIG. 2, there is also shown controlled fluid loss liquid 63 opposite lower permeable zone 29 and controlled fluid loss liquid 65 opposite upper permeable zone 27. This controlled fluid loss liquid is a low fluid loss liquid placed above a lateral barrier and aids in controlling the permeable zones and formation of other lateral barriers.

The first lateral impermeable barrier formed is positioned by locating the top of a first liquid in underground volume 11. Subsequent vertically spaced lateral barriers are also positioned by the level of a liquid in volume 11. Methods and apparatus for determining a liquid interface or level are commonly known and will not be discussed here since this invention is not limited to any particular system for locating the level of a liquid. After the top of the first liquid is located, there is injected into volume 11 a flowable time-setting barrier material which has a specific gravity less than the specific gravity of the first liquid. This light barrier material is flowable enough to spread laterally under the influence of gravitational forces through the rock rubble and form a floating layer on the heavier first liquid as more material is added to volume 11. It will be advantageous in some instances where the cross section of volume 11 is sufficiently wide to use two or more laterally spaced injection lines for placing the barrier material. The amount of barrier material injected is at least sufficient to form a layer that extends to the walls of volume 11; that is, extends to formation 15. The flowable barrier material in the layer sets to form at least a part of an impermeable barrier separating two vertically spaced sections of volume 11.

As mentioned previously, the thickness of the lateral impermeable barrier may be varied to fit existing conditions and barrier material could be injected until the level of the barrier material outside the injection line rises above a preset level controlled by the desired thickness of the barrier and the flow properties of the barrier material. For example, an especially thick barrier might be used to completely traverse a thin permeable stringer. Normally, the barrier will be at least a foot thick, and it is advantageous to have a barrier thicker than the size of the rocks in that lateral section of the rubble. Thus, the lateral barrier could be more than several feet thick. Where desired, the barrier could be made up of several layers and once a layer has been formed and sufficiently set, the material for the next layer does not need to be lighter than the first liquid. For this reason, throughout this specification it is stated that the first floating layer forms at least a part of the lateral impermeable barrier. It may also be advantageous to form the barrier in stages especially if the walls of volume 11 are highly fractured in which case the barrier material would flow outward into open fractures and seal them.

The flowable, time-setting barrier material is similar to the materials used for such purposes as consolidating sands, cementing wells, lining canals and disposal tanks, preventing coning in oil and gas production provided that such materials are sufficiently light, flowable, time-setting or gelling, and insoluble in the fluids to be placed in volume 11. Lightweight cements with a density of about eleven pounds per gallon are readily available for cementing oil and gas wells. There are also available thixotropic and permanent gel-type lightweight materials for packing a casing-borehole annulus.

Asphalts and plastics with and without fillers are available in time-setting and penetrating mixtures for use in subsurface activities. Asphalts are especially suitable because they are already light and are inexpensive. Asphalts have the further advantage of being readily mixed with emulsifiers, resins, plasticizers, solubilizers, adhesives, wetting agents, and the like to improve desirable properties such as adhesion, cohesion, plasticity, reduced shrinkage and other such properties.

The first liquid, over which the floating layer is formed, may be either a naturally occurring formation water or a specially prepared and injected liquid. An example of a specially injected liquid would be water containing calcium chloride as a weighting agent and a tracer material as an aid to conducting a permeability or injecting profile and to determining fluid level or interface. The first liquid or other liquids used to position lateral barriers may contain a material that reduces liquid loss to permeable zones. These liquids are called controlled or low fluid loss liquids and may be thixotropic liquids, viscous liquids, gelling solutions, or liquids containing fluid loss control additives; for example, drilling muds and earth fracturing liquids.

As mentioned previously, the first impermeable barrier formed is positioned by locating the top of a heavy first liquid in volume 11 and subsequent barriers are similarly positioned. It will normally be necessary to adjust or position the top of this first liquid. This is accomplished by either adding first liquid to volume 11 to raise the top of the first liquid, or by removing first liquid from volume 11 to lower or maintain the level of the first liquid, or by doing both at different times. The need and use for adjusting the upper level of the first liquid to properly position an impermeable barrier are illustrated by the following description of several ways for creating storage in volume 11.

A simple situation involving adjustment of the top of the first liquid occurs when volume 11 is filled with first liquid to a point above the desired location for the impermeable barrier. This could occur when first liquid was added to volume 11 for a permeability or injectivity profile test. In this situation, the method will include the step of removing first liquid from volume 11 until the desired fluid level is reached.

A more complicated situation arises when the first liquid is formation waters and these waters flow into volume 11 filling it to above the desired level. This situation requires that the first liquid (formation water) be removed to lower the level and that this level be maintained by continuing to remove water until the sealing material has been placed and forms a sufficiently impermeable barrier.

Other situations requiring adjustment of the level of the top of the first liquid pertain to the several likely arrangements for the impermeable section or zone of the walls of volume 11 and the permeable section or zone. In the simplest case, volume 11 is to be separated by a single barrier into two vertically spaced sections. The impermeable section may be above or below the permeable section. In this situation, except for those cases where the location of the impermeable section is already selected, the barrier is positioned by locating the approximate juncture of the impermeable section and the more permeable section. Thereafter, the top of the first liquid is adjusted by either removing first liquid from or adding first liquid to volume 11 until the top of the first liquid is at a level such that it will be practical to form a lateral barrier above the first liquid and accomplish the desired separation. This barrier and the subsequent barriers are used to separate an impermeable section opposite or in contact with volume 11; consequently, although it is preferred that the entire lateral barrier be in line with the impermeable section or zone, it is necessary that only a part of each lateral barrier will be at a level in line with a portion of the impermeable section. Because at least a part of each barrier must be in line with a point on an impermeable section, the top level of the liquid on which the barrier is to be formed must correspond to this requirement. For example, when the lateral barrier is to be formed near the top of a permeable zone and the bottom of an impermeable section, the top level of the positioning liquid may be in line with a part of either the permeable zone or the impermeable section because in either case, the barrier can be formed with a part of the barrier in line with a point on the impermeable section. But when the lateral barrier is to be formed near the top of an impermeable section or bottom of a permeable zone, the top level of the positioning liquid must be in line with a point in the impermeable section because the lowest point or barrier will never be below the level of the positioning liquid.

In a second situation, an impermeable section in the walls of volume 11 is to be separated from both overlying and underlying zones. An upper level and a lower level of the impermeable section in formation 15 surrounding volume 11 are located or selected from previous knowledge of the location of this section if available. Thereafter, the top of a first liquid in volume 11 is adjusted in a manner previously mentioned until the top of the first liquid is at a level such that a first lateral barrier may be formed on the first liquid with at least a portion of the first lateral barrier being in line with a lower portion of the selected impermeable zone. In other words, as mentioned above, the top level of the first liquid could be below the impermeable zone provided that the barrier extends upward into the impermeable zone. It is preferred, however, that the top level of the first liquid and other positioning liquids be in line with a point in the impermeable zone or section as this makes the barrier easier to form and assures separation.

With the top level of the first liquid in the proper position, a first batch of flowable time-setting barrier material is added to volume 11 to form a first layer over the top of the first liquid, which first layer forms all or a part of a first impermeable barrier when allowed to set in place. After the first impermeable barrier is formed, the top of a second liquid above the first impermeable barrier is adjusted until the top of second liquid is adjacent or in line with an upper portion of the impermeable zone, which upper portion is below the established or selected upper level for the impermeable zone. The second liquid may or may not be of a similar composition as the first liquid. With the top of the second liquid in this location, a second batch of flowable time-setting material is added to volume 11 to form a second layer over the top of the second liquid. This second batch is allowed to set in place and form at least a part of a second lateral impermeable barrier. The first and second lateral impermeable barriers thereby isolate the impermeable zone and form the top and bottom of a storage section in volume 11 in which fluids may be recoverably stored.

In a third situation, a permeable zone in the walls of volume 11 is to be separated from both overlying and underlying zones. The top and the bottom of the permeable zone in formation 15 surrounding volume 11 are located or established. In the alternative, an impermeable section of the walls above the permeable zone and an impermeable section of the walls below the permeable zone could be established rather than attempting to accurately determine the top and bottom of the permeable zone. Thereafter, the top of a first liquid in volume 11 is adjusted in a manner previously mentioned until the top of the first liquid is below the bottom of the permeable zone or is in line with the impermeable section below the permeable zone. With the top of the first liquid in this position, a first batch of flowable time-setting barrier material is added to volume 11 to form a first layer over the top of the first liquid. This first layer forms all or a part of a first lateral impermeable barrier when it is allowed to set in place. After the first impermeable barrier is formed, the top of a second liquid above the first impermeable barrier is adjusted to a level such that a second lateral barrier may be formed on the second positioning liquid with at least a portion of the second lateral barrier being in line with a portion of the selected upper impermeable zone. The top of the second positioning liquid will either be close enough to the top of the permeable zone that the second barrier extends upward into the impermeable section above the permeable zone, or that the top of the second positioning liquid will be in line with the impermeable section above the permeable zone. With the top of the second liquid thus located, a second batch of flowable time-setting material is added to volume 11 to form a second layer over the top of the second liquid. This second batch is allowed to set in place and form at least a part of a second lateral impermeable barrier. The first and second lateral impermeable barriers thereby isolate the permeable zone.

Frequently, it will be advantageous when isolating a permeable zone to place a low or controlled fluid loss liquid on top of the first barrier in an amount sufficient to traverse all or major portion of the permeable zone. This controlled fluid loss liquid contains a material that reduces loss of liquid to a permeable zone. This is illustrated in FIG. 2 by controlled fluid loss liquids 63 and 65. The low or controlled fluid loss flowable material could be the second liquid whose top is adjusted to locate or position the second or upper impermeable barrier. The low fluid loss liquid provides better control over the permeable zones and aids in forming the lateral barrier above the permeable zone.

What is claimed is:
1. Subsurface storage comprising a chimney created by a subsurface nuclear explosion, a lateral impermeable barrier at least partially composed of a time-setting material which has set, said barrier extending across said chimney and separating a first and a second section of said chimney, and a conduit system extending from the surface of the earth into said first section, said conduit system being suitable for adding liquid to and for removing liquid from said first section.

2. A method for subsurface storage of fluids comprising
(a) creating a subsurface volume of void spaces and rock rubble and having large vertical and lateral dimensions,
(b) selecting an impermeable section in the walls of the formation surrounding said subsurface volume,
(c) separating said impermeable section from another section of said subsurface volume with a lateral layer of flowable time-setting barrier material extending across said subsurface volume to said walls, and
(d) allowing said flowable time-setting barrier material to set thereby forming a barrier extending across said subsurface volume.

3. The method of claim 2 wherein after step (d) the method includes the step of recoverably storing fluids opposite the separated impermeable zone.

4. A method for a subsurface storage reservoir comprising
(a) locating the top of a first liquid in a subsurface volume comprised of void spaces and rock rubble,
(b) injecting into said subsurface volume a flowable, time-setting barrier material having a specific gravity less than the specific gravity of said first liquid and being flowable enough to form a floating layer on said first liquid, the minimum amount of said barrier material injected being sufficient to form a layer over the top of said first liquid and to extend at least to the walls of said subsurface volume, and
(c) allowing said time-setting barrier material to set thereby forming a barrier extending across said subsurface storage reservoir.

5. The method of claim 4 wherein the method includes the step of creating the subsurface volume, said subsurface volume being of large vertical length and lateral cross section.

6. The method of claim 4 wherein before step (b) the method includes the step of injecting first liquid into the subsurface volume.

7. The method of claim 6 wherein the method includes the step of creating the subsurface volume, said subsurface volume being of large vertical length and lateral cross section.

8. The method of claim 4 wherein before step (b) the method includes the step of removing first liquid from the subsurface volume.

9. The method of claim 8 wherein the method includes the step of creating the subsurface volume, said subsurface volume being of large vertical length and lateral cross section.

10. A method for a subsurface storage reservoir comprising
(a) locating the top of a first liquid in a subsurface volume comprised of void spaces and rock rubble,
(b) locating a permeable zone and an impermeable zone in the formation surrounding said subsurface volume and adjusting the location of the top of said first liquid to level such that a lateral impermeable barrier may be formed on said first liquid and separate a section of said subsurface volume opposite said impermeable zone from a section of said subsurface volume opposite said permeable zone,
(c) injecting into said subsurface volume a flowable, time-setting barrier material having a specific gravity less than the specific gravity of said first liquid and being flowable enough to form a floating layer on said first liquid, the minimum amount of said barrier material injected being sufficient to form a layer over the top of said first liquid and to extend at least to the walls of said subsurface volume, and
(d) allowing said time-setting barrier material to set thereby forming a barrier extending across said subsurface storage reservoir.

11. The method of claim 10 wherein the method includes the step of recoverably storing fluids opposite the impermeable zone.

12. The method of claim 10 wherein the method includes the step of creating the subsurface volume, said subsurface volume being of large vertical length and lateral cross section.

13. A method for a subsurface storage reservoir comprising
(a) locating the top of a first liquid in a subsurface volume comprised of void spaces and rock rubble,
(b) removing first liquid from said subsurface volume,
(c) injecting into said subsurface volume a flowable, time-setting barrier material while removing said first liquid from said subsurface volume, said barrier material having a specific gravity less than the specific gravity of said first liquid and being flowable enough to form a floating layer on said first liquid, the minimum amount of said barrier material injected being sufficient to form a layer over the top of said first liquid and to extend at least to the walls of said subsurface volume, and
(d) allowing said time-setting barrier material to set thereby forming a barrier extending across said subsurface storage reservoir.

14. A method for subsurface storage in a subsurface volume of void spaces and rock rubble surrounded by a formation having an impermeable zone comprising
(a) adjusting the top of a first liquid in said subsurface volume until the top of said first liquid is at a level such that a first lateral barrier may be formed on said first liquid with at least a portion of said first lateral barrier being in line with a lower portion of said impermeable zone,
(b) injecting into said subsurface volume a first batch of flowable time-setting barrier material having a specific gravity less than the specific gravity of said first liquid and being flowable enough to form a floating layer on said first liquid, said first batch of said barrier material being in an amount sufficient to form a first layer over the top of said first liquid and to at least extend to the wall of said subsurface volume,
(c) allowing said first batch of said barrier material to set in place to form at least a part of a first lateral impermeable barrier across said volume,
(d) adjusting the top of a second liquid above said first lateral barrier material until said top of said second liquid is in line with an upper portion of said impermeable zone, and
(e) injecting into said subsurface volume above said first lateral barrier a second batch of flowable time-setting barrier material having a specific gravity less than the specific gravity of said second liquid and being flowable enough to form a floating layer on said second liquid, said second batch of said barrier material being in an amount sufficient to form a second layer over the top of said second liquid and to extend to the wall of said subsurface volume.

15. The method of claim 14 wherein before step (a) the method includes the step of creating the subsurface volume of large vertical length and lateral cross section.

16. The method of claim 14 wherein the method includes the step of recoverably storing fluids opposite the impermeable zone.

17. A method for subsurface storage in subsurface volume of void spaces and rock rubble surrounded by a formation having a permeable zone overlain by an upper impermeable zone and underlain by a lower impermeable zone comprising
(a) adjusting the top of a first liquid in said subsurface volume until said top of said first liquid is in line with an upper portion of said lower impermeable zone,
(b) injecting into said subsurface volume a first batch of flowable time-setting barrier material having a specific gravity less than the specific gravity of said first liquid and being flowable enough to form a floating layer on said first liquid, said first batch of said barrier material being in an amount sufficient to form a first layer over the top of said first liquid and to extend to the wall of said subsurface volume, (c) allowing said first batch of said barrier material to set in place to form at least a part of a first lateral impermeable barrier extending across said subsurface volume, (d) adjusting the top of a second liquid above said first lateral barrier to a level such that a second lateral barrier may be formed on said second liquid with at least a portion of said second lateral barrier being in line with a portion of said upper impermeable zone, and (e) injecting into said subsurface volume above said first lateral barrier a second batch of flowable time-setting barrier material having a specific gravity less than the specific gravity of said second liquid and being flowable enough to form a floating layer on said second liquid, said second batch of said barrier material being in an amount sufficient to form a second layer over the top of said second liquid and to extend to the wall of said subsurface volume.

18. The method of claim 17 wherein before step (a) the method includes the step of creating the subsurface volume of large vertical length and lateral cross section.

19. The method of claim 17 wherein step (d) the second liquid is a liquid containing a fluid loss control material to reduce loss of said second liquid to a permeable zone.

20. The method of claim 19 wherein before step (a) the method includes the step of creating the subsurface volume of large vertical length and lateral cross section.

References Cited
UNITED STATES PATENTS

| | | | |
|---|---|---|---|
| 2,942,424 | 6/1960 | Koble | 61—.5 |
| 3,058,316 | 10/1962 | Toche | 61—.5 X |
| 3,064,436 | 11/1962 | Loofbourow et al. | 61—.5 |
| 3,068,654 | 12/1962 | Warren | 61—.5 |

JACOB SHAPIRO, Primary Examiner

U.S. Cl. X.R.

166—26